United States Patent
Peters et al.

(10) Patent No.: US 10,285,410 B2
(45) Date of Patent: May 14, 2019

(54) METHOD FOR CUTTING OPEN A SLAUGHTERED ANIMAL WHICH IS SUSPENDED WITH ITS LEGS FROM A SUSPENSION HOOK OF A CONVEYOR

(71) Applicant: Marel Stork Poultry Processing B.V., Boxmeer (NL)

(72) Inventors: Erik Hendrikus Werner Peters, Boxmeer (NL); Marc Johan Halfman, Zeddam (NL); Bastiaan Wilhelmina Johannus Elizeus Josephus Drabbels, Vierlingsbeek (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 767 days.

(21) Appl. No.: 14/399,419

(22) PCT Filed: Aug. 25, 2014

(86) PCT No.: PCT/NL2014/050572
§ 371 (c)(1),
(2) Date: Nov. 6, 2014

(87) PCT Pub. No.: WO2015/002542
PCT Pub. Date: Jan. 8, 2015

(65) Prior Publication Data
US 2016/0262409 A1    Sep. 15, 2016

(30) Foreign Application Priority Data
Aug. 30, 2013 (NL) ...................... 2011361

(51) Int. Cl.
A22C 21/06 (2006.01)
A22B 5/00 (2006.01)
(Continued)

(52) U.S. Cl.
CPC ............ *A22C 21/06* (2013.01); *A22B 5/0005* (2013.01); *A22B 5/0023* (2013.01);
(Continued)

(58) Field of Classification Search
CPC ... A22B 5/0005; A22B 5/0017; A22B 5/0023; A22B 5/0094; A22C 21/00; A22C 21/06
(Continued)

(56) References Cited

U.S. PATENT DOCUMENTS 1,980,904 A    11/1934    Botz
3,958,302 A *  5/1976    Meyn .................. A22B 5/0094
                                                        452/120
(Continued)

FOREIGN PATENT DOCUMENTS

EP    0598957    6/1994
NL    6905933    10/1969
(Continued)

*Primary Examiner* — David J Parsley
(74) *Attorney, Agent, or Firm* — Casimir Jones, SC; Robert A. Goetz

(57) ABSTRACT

The invention relates to a method for cutting open a slaughtered animal, in particular fowl, which is suspended with its legs from a suspension hook of a conveyor, in particular, but not limited to, making an incision in the belly of a slaughtered bird, wherein the method comprises the step of making a first incision in the skin of the slaughtered animal, which first incision extends substantially in a first direction of the slaughtered animal.

5 Claims, 10 Drawing Sheets

(51) Int. Cl.
   *A22C 21/00*   (2006.01)
   *A23L 13/50*   (2016.01)

(52) U.S. Cl.
   CPC ........ *A22B 5/0094* (2013.01); *A22C 21/0023* (2013.01); *A22C 21/0038* (2013.01); *A22C 21/0046* (2013.01); *A22C 21/0053* (2013.01); *A23L 13/50* (2016.08); *A23V 2002/00* (2013.01)

(58) Field of Classification Search
   USPC .......................................... 452/120, 150, 151
   See application file for complete search history.

(56) References Cited

U.S. PATENT DOCUMENTS

| | | | | |
|---|---|---|---|---|
| 4,059,868 A | * | 11/1977 | Meyn | A22B 5/0094 452/120 |
| 4,118,829 A | | 10/1978 | Harben, Jr. | |
| 4,265,001 A | * | 5/1981 | Hathorn | A22B 5/0094 452/120 |
| 4,266,322 A | * | 5/1981 | van Mil | A22B 5/0094 452/120 |
| 4,467,500 A | * | 8/1984 | Olson | A22B 5/0094 452/120 |
| 4,731,907 A | * | 3/1988 | Tieleman | A22C 21/06 452/120 |
| 5,015,213 A | * | 5/1991 | Hazenbroek | A22C 21/0023 452/149 |
| 5,019,013 A | * | 5/1991 | Hazenbroek | A22C 21/0023 452/151 |
| 5,041,053 A | * | 8/1991 | Ellis | A22C 21/06 452/106 |
| 5,803,802 A | * | 9/1998 | Jansen | A22C 21/06 452/120 |
| 5,816,904 A | * | 10/1998 | Tieleman | A22C 21/06 452/120 |
| 6,312,326 B1 | * | 11/2001 | van den Nieuwelaar | A22B 5/0094 452/120 |
| 6,558,243 B2 | * | 5/2003 | Minemura | A22C 21/0023 452/149 |

FOREIGN PATENT DOCUMENTS

| | | |
|---|---|---|
| WO | 87/06102 | 10/1987 |
| WO | 98/31232 | 7/1998 |
| WO | 99/16321 | 4/1999 |

* cited by examiner

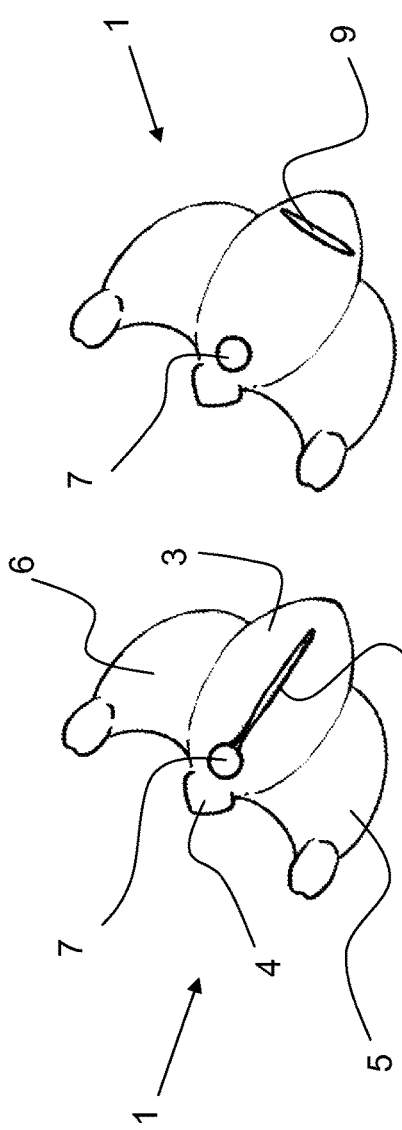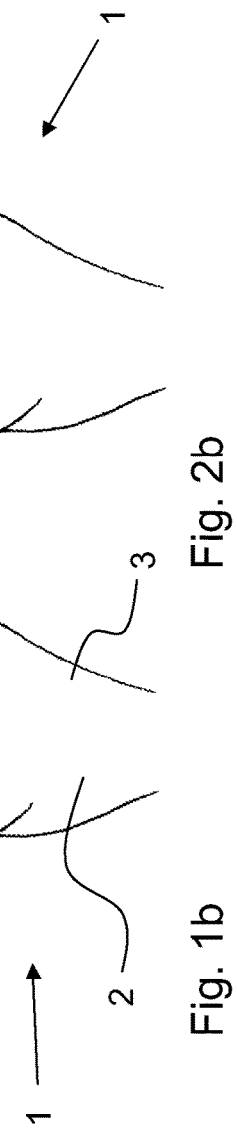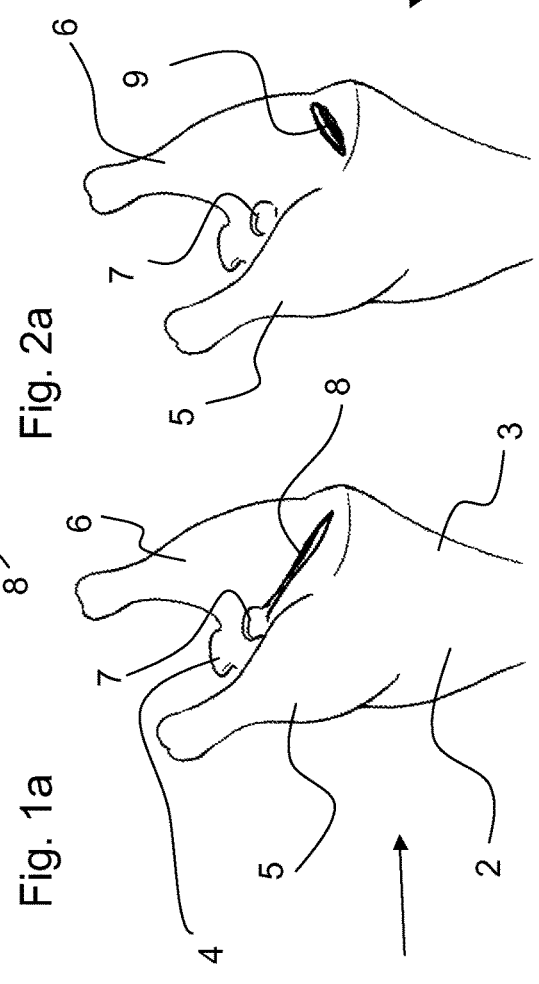

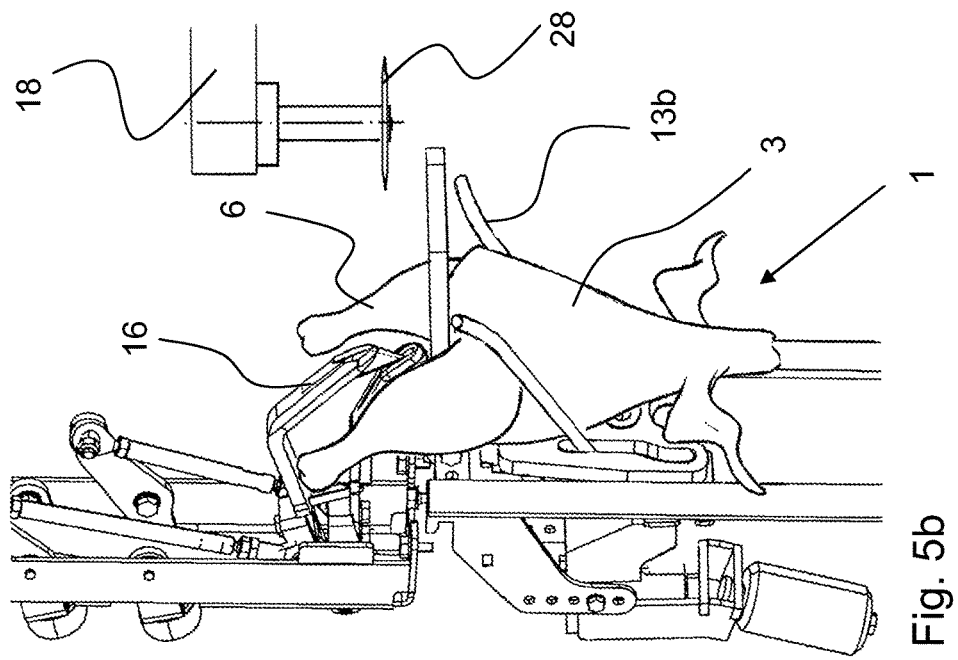
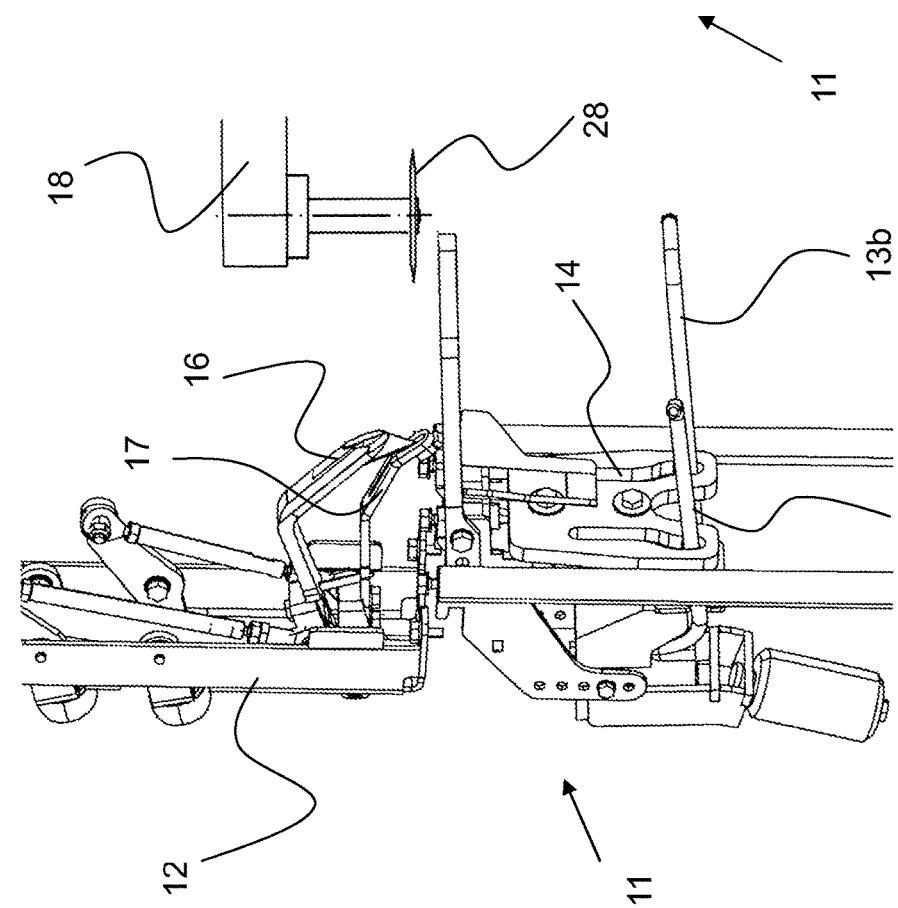
Fig. 5a
Fig. 5b

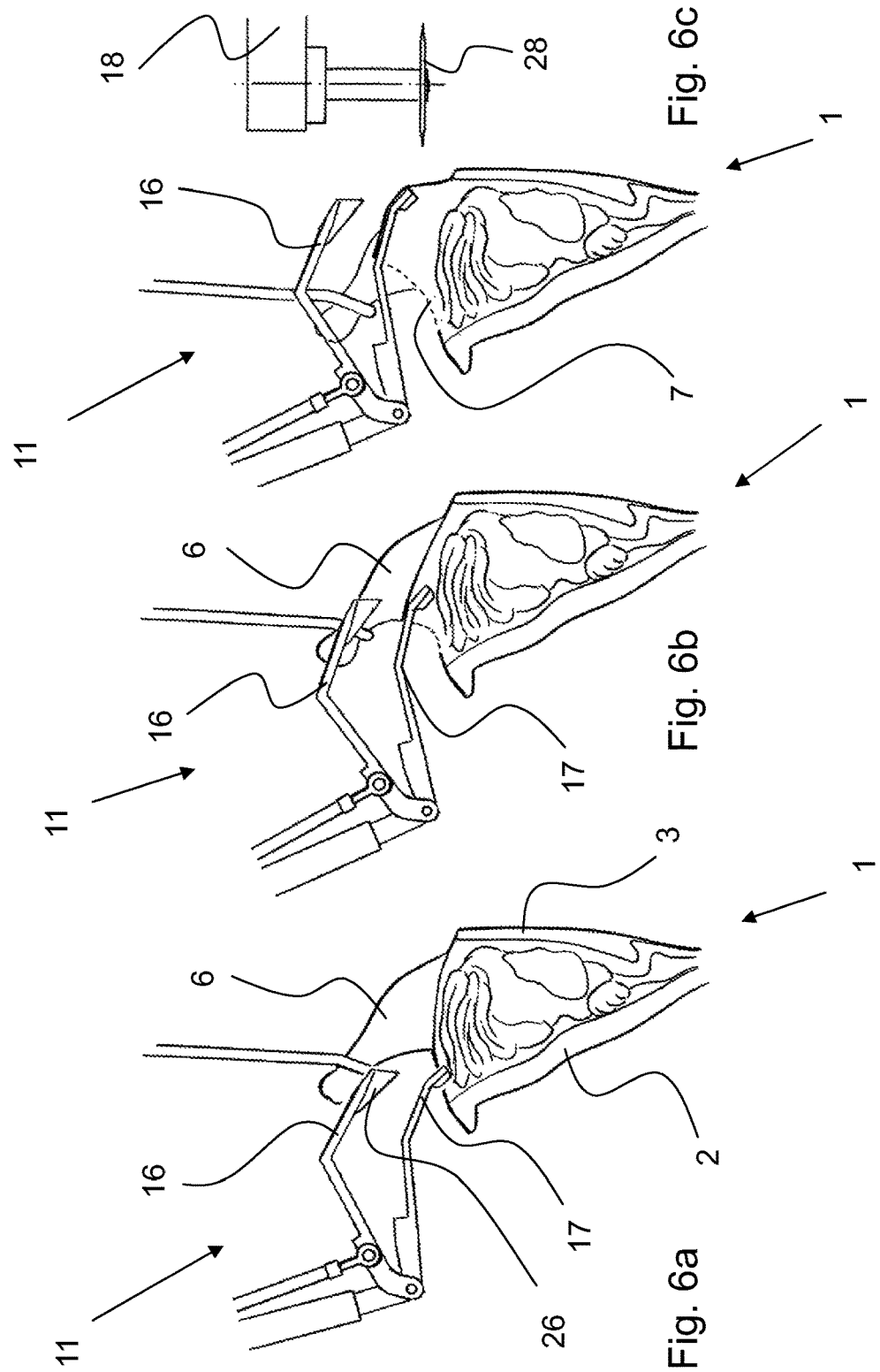

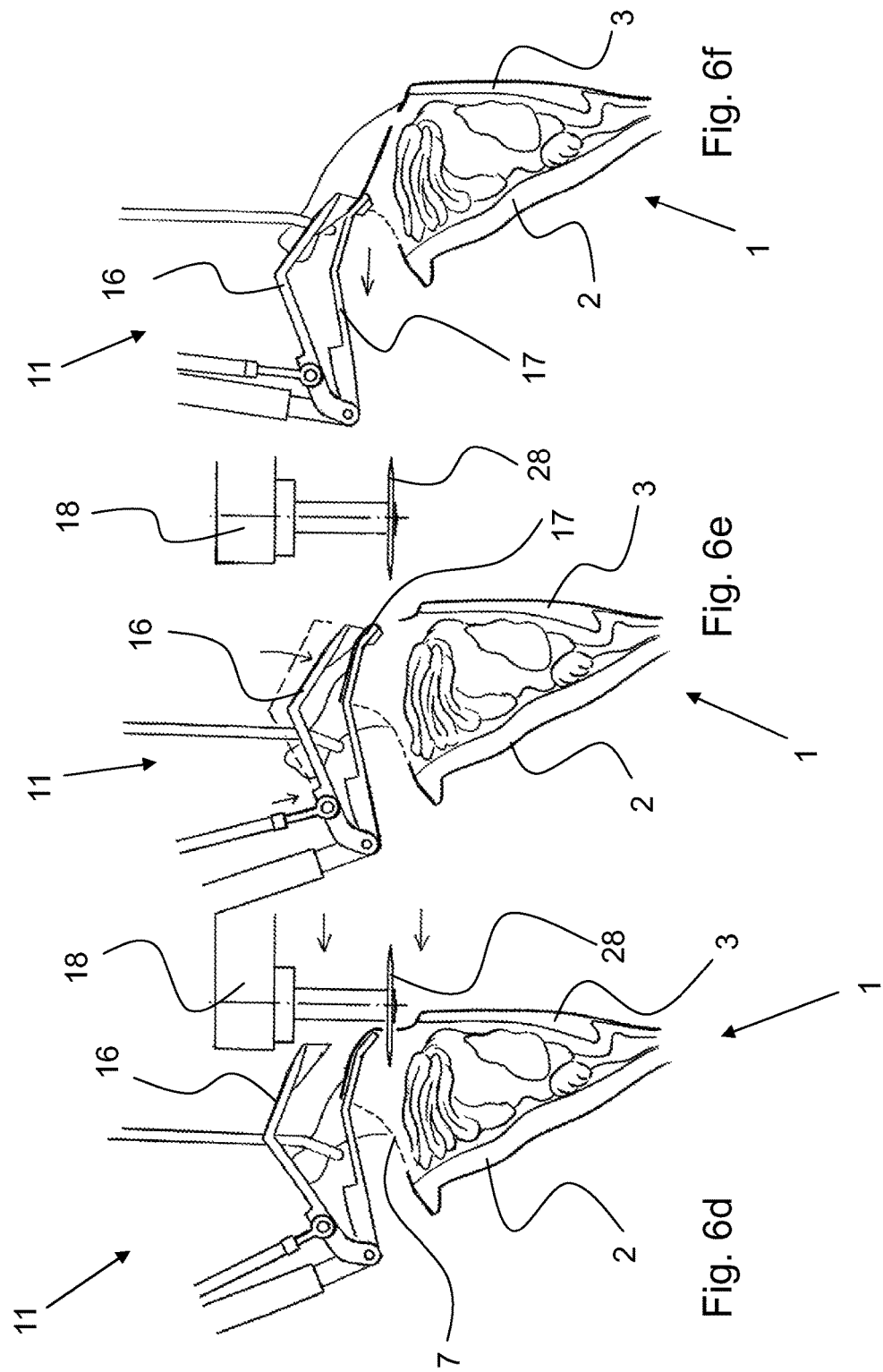

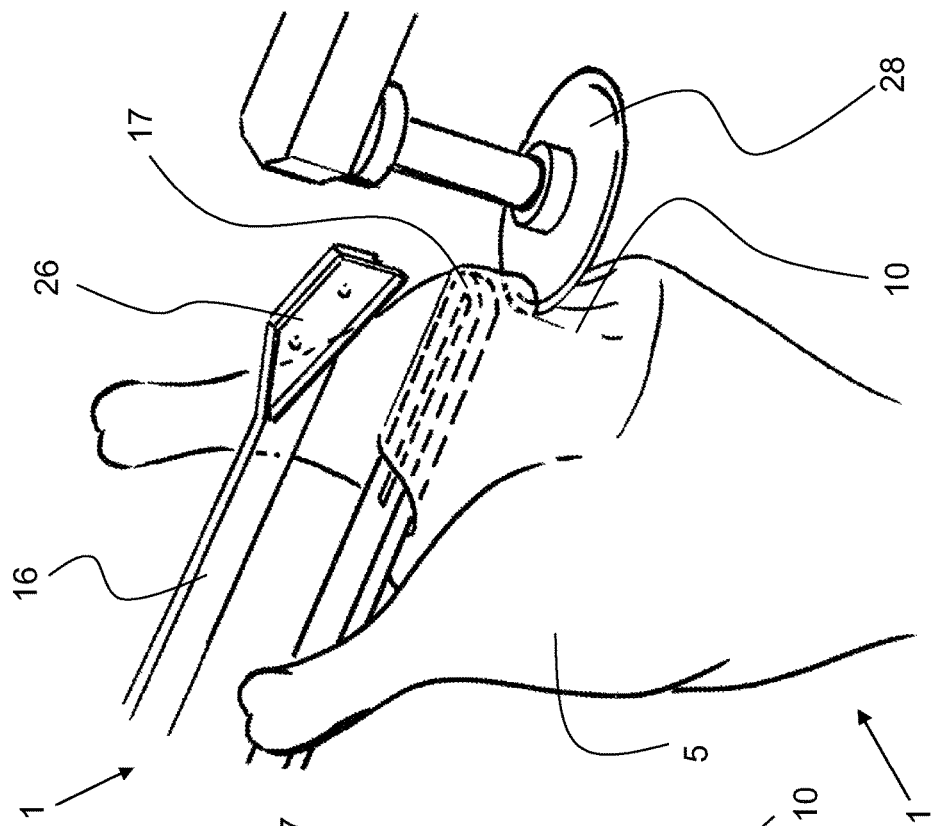
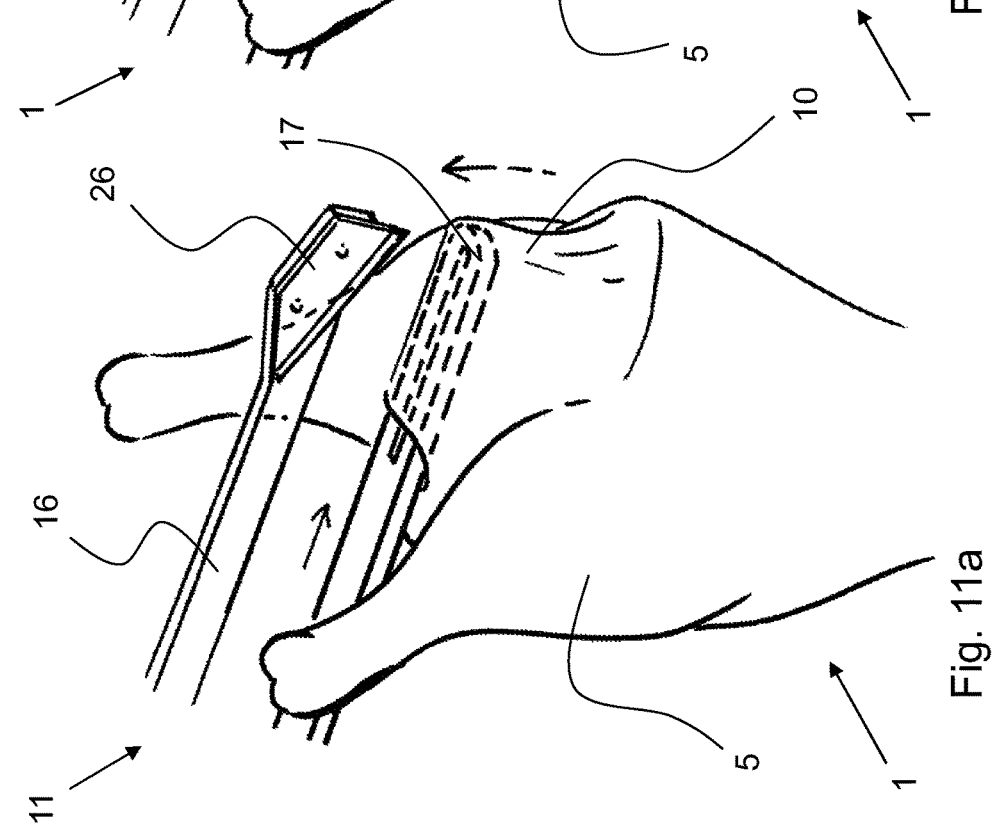

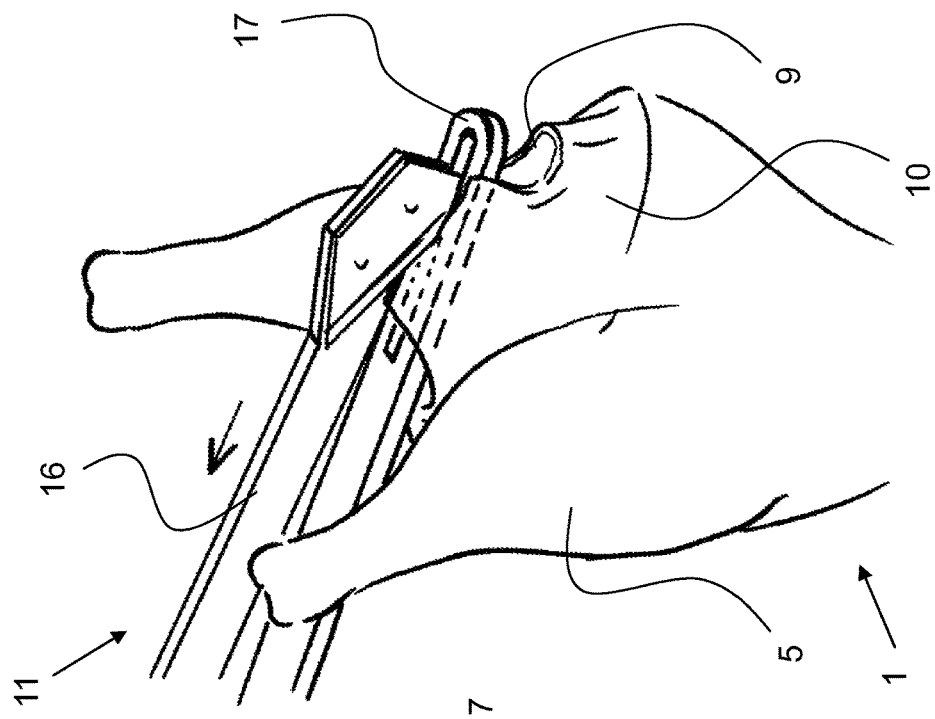
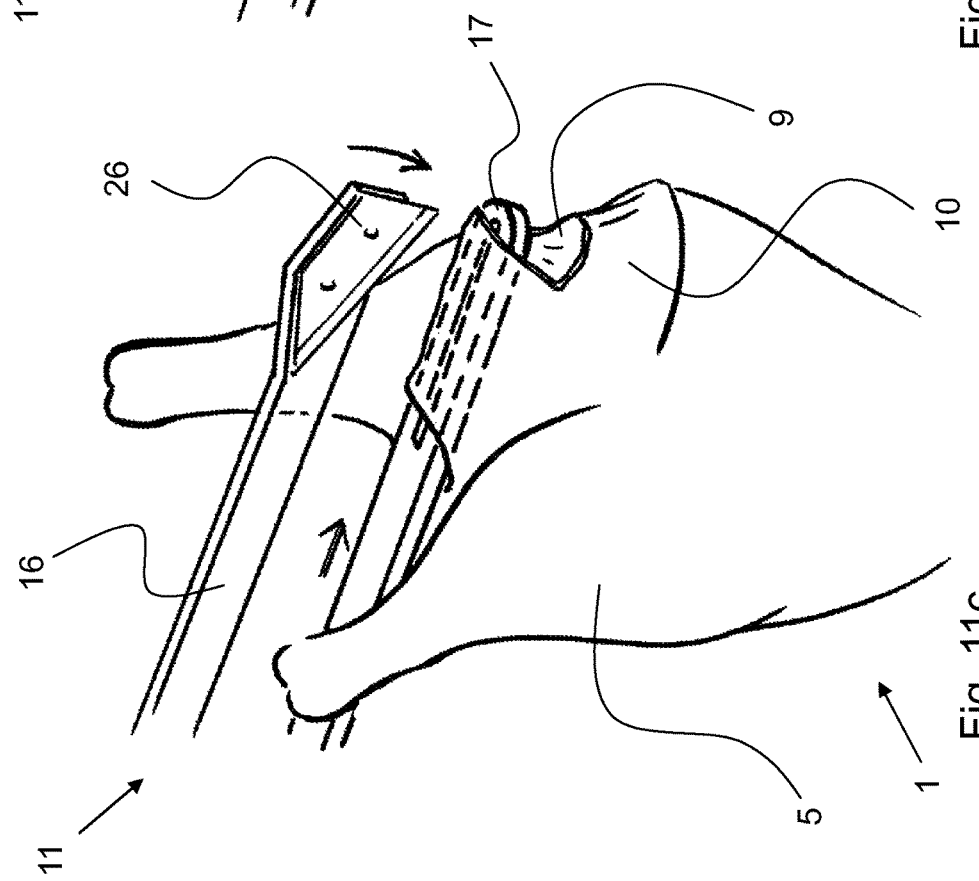

METHOD FOR CUTTING OPEN A SLAUGHTERED ANIMAL WHICH IS SUSPENDED WITH ITS LEGS FROM A SUSPENSION HOOK OF A CONVEYOR

CROSS REFERENCE TO RELATED APPLICATIONS

The present application is a Section 371 U.S. national stage entry of pending International Patent Application No. PCT/NL2014/050572, International Filing Date Aug. 25, 2014, which claims the benefit of Dutch Patent Application No. 2011361, filed Aug. 30, 2013, the contents of which are incorporated by reference in their entireties.

The invention relates to a method for cutting open a slaughtered animal which is suspended with its legs from a suspension hook of a conveyor, in particular, but not limited to, making an incision in the belly of a slaughtered bird, wherein the method comprises the step of making a first incision in the skin of the slaughtered animal, which first incision extends substantially in a first direction of the slaughtered animal.

EP 1 018 890 B1 describes a method and a device for making an incision in the skin of the slaughtered animal and for carrying out a subcutaneous operation. The method comprises making an incision, using a tensioning element provided with a knife, which incision extends from an opening around the cloaca to the tip of the breast.

NL 6 915 661 A describes the manner in which a transverse incision is made in the skin of the belly of the bird, spaced from the cloaca. In some countries such a transverse incision is made so that a piece of skin will remain intact between the cloaca and the incision. The legs of the slaughtered animal can then be inserted under the skin upon packaging.

It is an object of the present invention to provide an improved method for cutting open a slaughtered animal which is suspended with its legs from a suspension hook of a conveyor, by means of which method the viscera of the slaughtered animal can be removed in a relatively simple manner after said cutting open.

With this object in view, the invention provides a method of the kind described in the introduction, which method is according to the invention characterised by the step of making a second incision connected to the first incision and extending at an angle thereto in the skin of the slaughtered animal.

For certain markets it is desirable that the cut in the slaughtered animal is as small as possible, for example in order to retain as much belly fat as possible, or for presentation purposes in the sale. The invention is based on the surprising insight that by making an additional cut extending at an angle to the first cut, a relatively small cut, which in fact consists of two separate incisions extending at an angle to one another, will suffice for removing the viscera after said cutting open. A small cut ensures that the belly fat is retained. The relatively smaller cut also ensures that the aforesaid cutting open can take place more quickly. The object of the present invention is thus achieved.

In the present application the term "first incision" is used. This need not necessarily be the very first incision that is made in the slaughtered animal. Prior incisions may be made in the skin of the slaughtered animal. In the prior art, a cut or the like is frequently made in fowl for boring out the cloaca before the slaughtered animal is cut open. It is noted that in the present application the term "cloaca" not only refers to the organ in question, but also to the opening in the animal after the organ has been removed, for example by being bored out.

According to the present invention, two incisions being connected to each other are made, which incisions furthermore extend at an angle relative to one another and which, for the sake of clarity, are referred to as the first and the second incision, without a specific order being allocated thereto, unless, of course, this follows implicitly or explicitly from the description thereof.

According to one embodiment of the present invention, the first incision is made first, after which the second incision is made.

In one embodiment of the method, the first incision extends substantially in the transversal plane, on the ventral side of the slaughtered animal. The term "transversal plane" is understood to mean that the second incision extends substantially from a left-hand side of the slaughtered animal to a right-hand side (or vice versa) of the slaughtered animal. An angle relative to the transversal plane is conceivable in that regard. Said angle may amount to as much as 40°, but preferably it is at most 30°.

According to the present invention, the second incision extends at an angle different from zero relative to the first incision. In one embodiment of the method according to the present invention, the second incision extends substantially in the median plane, on the ventral side of the slaughtered animal. The second incision thus extends substantially from a caudal part or, in other words, a part near the tail, of the slaughtered animal to a rostral part of the slaughtered animal. The second incision need not fully coincide with the median plane. An angle relative to said median plane is conceivable and falls within the meaning of the phrase "substantially in the median plane". The angle relative to the median plane may amount to as much as 40°, but preferably it is at most 30°. The second incision further extends substantially on the ventral side or, in other words, the belly side, of the slaughtered animal.

In one embodiment, the second incision extends substantially transversely to the first incision. The angle between the first incision and the second incision is substantially 90°, although a slightly different angle is conceivable. The angle preferably ranges between 80° and 100°, therefore. In other embodiments, larger or smaller angles are conceivable. However, the angle is preferably larger than 45° and preferably smaller than 135°.

In one embodiment, one end of the first incision substantially coincides with a part of the second incision. The first incision in that case terminates at said part of the second incision. Accordingly, one end of the second incision may substantially coincide with a part of the first incision.

In one embodiment it is conceivable in that case that an end of the first or the second incision coincides with an end of the other of the first or the second incision so as to form a substantially "L"-shaped cut. The base of the "L" may of course extend at an angle different from 90° relative to the leg of the "L".

According to another embodiment, the end of the first or the second incision coincides with a central part of the other of the first or the second incision, so that a substantially "T"-shaped cut is obtained. In this case, too, it obtains that the top of the "T" may extend at an angle relative to the vertically extending part of the "T". Furthermore, the lengths of the two parts of the "T" may be freely selected, i.e. the cuts need not necessarily have dimensions that are usual for the letter "T".

In one embodiment, the length of the first incision, which is the first incision that is made in a preferred embodiment, is smaller than the length of the second incision. In a preferred embodiment, the second incision is therefore made for the purpose of providing an incision which is suitable for further operations, and wherein the first incision, which is made substantially smaller than the second incision, functions to reduce the tension in the skin of the slaughtered animal. Preferably, the length of the second incision is less than 50% of the length of the first incision, although other proportions are conceivable.

In one embodiment of the method, the first and/or the second incision extend(s) substantially rectilinearly.

In one embodiment of the method, the skin is stretched before the first and/or the second incision is/are made. In one embodiment of the method, the skin is stretched before the first incision is made, with the stretched condition of the skin being maintained while the second incision is made. According to one embodiment, the stretched condition of the skin is therefore maintained while the first incision and/or the second incision is/are made.

In one embodiment of the method, the slaughtered animal comprises fowl, such as chicken, and the second incision is made from the fowl's cloaca.

In case of fowl, such as chicken, it is preferred that the first and/or the second incision is made, after the cloaca of the fowl has been removed.

In another embodiment, the first incision is located spaced from the cloaca.

According to one aspect of the invention, there is provided a method for removing at least part of the viscera of a slaughtered animal, in particular fowl, which is suspended with its legs from a suspension hook of the conveyor, wherein the method comprises the step of making an incision in the skin of the slaughtered animal, which incision extends substantially in the transversal plane, on the ventral side of the slaughtered animal, and wherein the method comprises the step of removing at least part of the viscera of the slaughtered animal via the incision. The method is characterised by the step of making an incision connected to the first incision and extending at an angle thereto in the skin of the slaughtered animal prior to removing the viscera. Thus it is possible to realise a relatively small cut in the skin of the slaughtered animal, which cut is subsequently suitable for removing the viscera from the slaughtered animal can thus be suitably removed via said cut. The object of the present invention is thus achieved.

Advantageous embodiments of this method have already been discussed in the foregoing with reference to the method for cutting open the slaughtered animal. The skilled person will appreciate that the preferred embodiments for cutting open the slaughtered animal can be used in the method for removing part of the viscera of the slaughtered animal. It is in particular conceivable in that regard that the incision corresponds to the first or the second incision of the previously described method, and that the incision corresponds to the other of the first or the second incision. In a preferred embodiment, the incision corresponds to the first incision as previously described, wherein the incision is the first incision that is made, and the incision corresponds to the second incision, and this incision is made after the incision.

As already indicated, the method according to the present invention can be used with fowl, such as chicken. It is preferable in that regard that the method is carried out on fowl whose cloaca has already been removed. As already indicated, the term "cloaca" in that case refers to the opening formed by the removal of the cloaca organ.

According to one aspect of the invention, there is provided a device for cutting open a slaughtered animal which is suspended with its legs from a suspension hook of a conveyor. The device comprises first cutting means for making a first incision in the skin of the slaughtered animal. The cutting means are designed so that the first incision can be made substantially in a first direction of the slaughtered animal. According to the present invention, the device comprises second cutting means designed for making a second incision connected to the first incision and extending at an angle thereto in the skin of the slaughtered animal. Using the device as described above, it is possible to carry out a method according to the present invention. Thus, the advantages of the method can be achieved with the device as well. Said advantages will not be explained once again, therefore.

An additional advantage of the device is that a large number of desired cuts can be made therewith. The use of the first cutting means and the second cutting means in principle makes it possible to make any cut, a few of which are already known from the prior art, using a single device. Because of this, the device according to the present invention can be put to use in a very flexible manner.

In one embodiment of the device, the device comprises stretching means for stretching the skin of the slaughtered animal. Said stretching prevents the underlying tissue from being damaged when cutting takes place. The stretching means are preferably designed for stretching the skin in those places where cutting by the first and the second cutting means is to take place.

In one embodiment, the stretching means are provided near the second cutting means. Using this embodiment, it will be easy to stretch the skin, for example for the first cutting means, after which the skin will still be stretched for the second cutting means. Thus, a single stretching element will suffice.

In another embodiment, the second cutting means comprise a knife element. Said knife element may be a cutting blade or the like, which makes a cut in the skin of the slaughtered animal by making a substantially translatory movement in the cutting direction.

In another embodiment, the first cutting means comprise a rotary disc. Using a rotary disc, a well-controlled incision can be made. The device to that end comprises suitable driving means for rotating the rotary disc.

The device is preferably designed so that the first cutting means make a first incision and that the second cutting means then make a second incision.

According to another aspect of the present invention, there is provided a meat product, in particular fowl, comprising a body and at least two legs connected to the body, wherein the body is at least partially covered by skin, wherein the meat product is provided with a first incision made in the skin of the meat product, which first incision extends substantially in the transversal plane, on the ventral side of the meat product. Such a meat product is for example used for placing the legs of the meat product, in particular the fowl, under the skin portion that has been loosened. According to this aspect of the invention, the meat product is provided with a second incision connected to the first incision and extending at an angle thereto in the skin of the meat product, which second incision extends substantially in the median plane, on the ventral side of the slaughtered animal.

In one embodiment, at least an end of one of the legs, or ends of each of the legs, is inserted into at least part of the interior of the body via the first and the second incision.

In one embodiment, the meat product is fowl. In one embodiment, the first and the second incision are fully spaced from the fowl's cloaca. Such an embodiment is ideal with regard to inserting the legs under a skin fold.

The invention will be explained in more detail hereinafter with reference to the appended figures, in which a few preferred embodiments of the present invention are shown. In the figures:

FIGS. 1a and 1b show a prior art embodiment of an incision in a slaughtered animal;

FIGS. 2a and 2b show an alternative prior art embodiment of a transverse incision in a slaughtered animal;

FIGS. 5a and 5b show a device for obtaining a meat product according to the present invention, in which FIG. 5b shows a slaughtered animal which is suspended with its legs from a suspension hook of a conveyor;

FIGS. 6a-6f are partially sectional side views showing the various steps of the method according to the present invention, using the device according to the present invention;

FIGS. 11a-11d are more detailed views showing various steps of the method according to the present invention;

FIGS. 1a, 1b, 2a and 2b show prior art incisions in fowl.

Figure 3A:
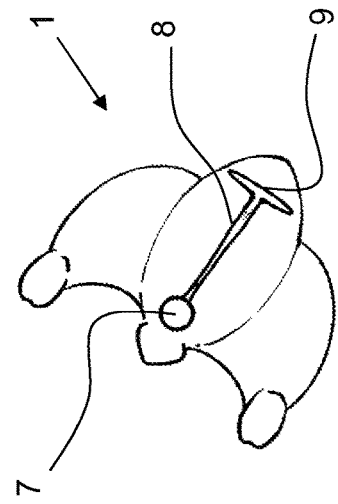
FIGS. 3a and 3b show a first embodiment of a meat product according to the present invention.

FIG. 1a shows a slaughtered animal 1, fowl in this case, in particular a chicken 1, comprising a body 3 with a tail portion 4, to which two legs 5, 6 are connected. The fowl comprises a cloaca 7, already removed in this case; hereinafter the opening formed by the removal of the cloaca will also be referred to as cloaca 7. FIG. 1a thus shows a view of the belly side 3 of the fowl. According to the prior art, an incision 8 is provided on the belly side of the chicken 1. Said incision extends from the cloaca 7 to a breast portion of the chicken 1. FIG. 1b shows the view of FIG. 1a in perspective view. Like parts are indicated by the same numerals. This applies to all the figures to be discussed hereinafter, i.e. like parts are consistently indicated by the same numerals, even though it is conceivable that the various parts are slightly different from each other.

FIG. 2a shows a belly view of the fowl 1 according to another embodiment of the prior art, in which an incision has been made in the transversal plane, i.e. an incision that extends from the left-hand side to the right-hand side of the fowl 1. Such an incision is for example used for placing the legs 5, 6 of the fowl 1 therein under a skin fold.

The above-described prior art incisions provide in a relatively large cut. In addition to that there is a risk of loss of belly fat, which is undesirable in some markets.

Figure 3B:
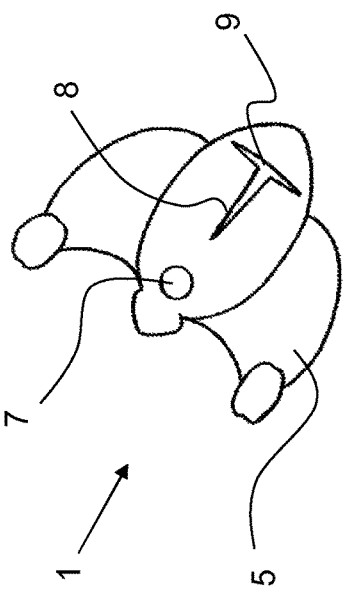

FIGS. 3a and 3b show a first embodiment of the invention. The figures show a slaughtered animal 1, in this case fowl 1 in the form of a chicken, for example, on which the method according to the present invention has been used. According to the method of the present invention, a first incision 9 is made in a first direction of the slaughtered animal, and subsequently a second incision 8 being connected to the first incision 9 and extending at an angle thereto is made in the skin of the slaughtered animal. FIG. 3a shows an embodiment in which the first incision 9 extends substantially transversely to the second incision 8. As the figure further shows, the second incision terminates at a central part of the first incision 9. Because the second incision extends substantially transversely to the first incision 9, a T-shaped cut in the fowl 1 has been obtained. Such a cut is very suitable for removing the viscera from the fowl 1. It is noted that in this embodiment the second incision 8 does not fully extend up to the cloaca 7 of the fowl 1. Removing the viscera will be easier when the method according to the invention is used.

Figure 4A:
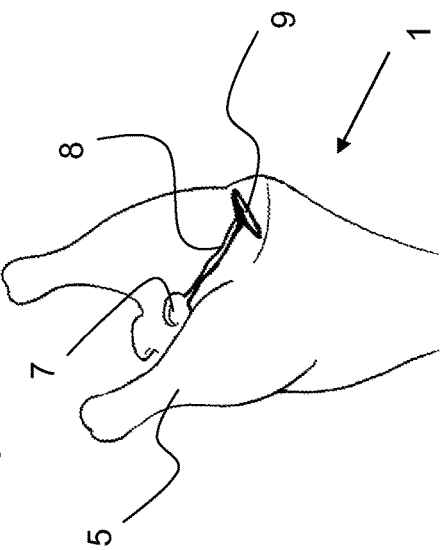
FIGS. 4a and 4b show a second embodiment of a meat product according to the present invention.
Figure 4B:
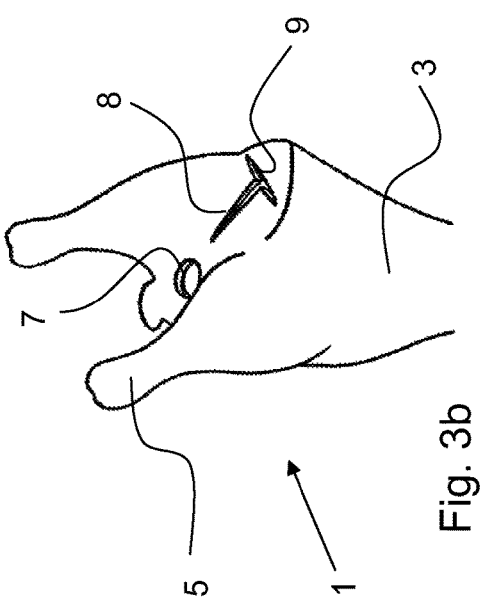

FIGS. 4a and 4b are a belly view and a perspective view, respectively, of a fowl according to a second embodiment of the present invention. This embodiment is different from the first embodiment shown in FIGS. 3a and 3b in that the second incision 8 fully extends up to the cloaca 7. In this case it will even be easier to remove the viscera in a next step. In addition to that, a great fat efficiency is obtained.

FIG. 5a is a side view of the device 11 for using the method for cutting open a slaughtered animal according to the present invention which is suspended with its legs from a suspension hook of a conveyor. The device 11 comprises a frame 12 which forms part of the conveyor (not shown). Such a conveyor comprising a frame is in principle known to the skilled person and will not be explained in more detail herein. The device 11 further comprises two suspension hooks 13a, 13b, from which the fowl 1 can be suspended (see FIG. 5b). The suspension hooks 13a, 13b are to that end moved in upward direction through slots 14. As is clearly shown in FIG. 5a, the device 11 comprises first cutting means 18 provided with a first cutting element 28. Second cutting means 16 are provided spaced therefrom. Said cutting means are disposed above a stretching element 17. The device 11 will be explained in more detail yet hereinafter.

With reference now to FIGS. 6a-6f, the method according to the present invention, used in combination with the above-described device 11, will be explained in more detail. FIG. 6a shows a first step of an embodiment according to the present invention. In said first step, the stretching element 17 is inserted into the fowl's cloaca and moved under the skin, as is clearly shown in FIG. 6b. The second cutting means 16 is still spaced from the fowl 1 in this case, so that no cutting of the skin is taking place yet. The stretching element 17 moves further (see FIG. 6c), and is designed so that the skin of the fowl 1 is stretched. The first cutting means are subsequently moved near the stretched skin.

FIG. 6d shows that the first cutting means 18 provided with the first cutting element 28 in the form of a rotary knife are moved toward the fowl 1 in a transversal direction such that an incision is made in the skin. The incision is located on a belly side 3 of the fowl 1. The incision is made between the stretching element 17 and a rostral part of the fowl 1. After said first incision has been made, the first cutting means 18 provided with the first cutting element are moved back, away from the fowl 1, whereupon the second cutting means 16 are activated and a second incision is made in the fowl 1. As the figure shows, the stretching means still stretch the skin, so that the skin is stretched also while the second incision is being made. It is noted in that regard that the first incision extends substantially transversely to the median plane and that the second incision is provided substantially parallel to the median plane. In the embodiment shown in FIG. 6e, the two incisions are provided substantially perpendicular to each other. FIG. 6f, to conclude, shows the final movement of the second cutting means 16, in which the second incision is completed up to the cloaca.

Figure 7B:
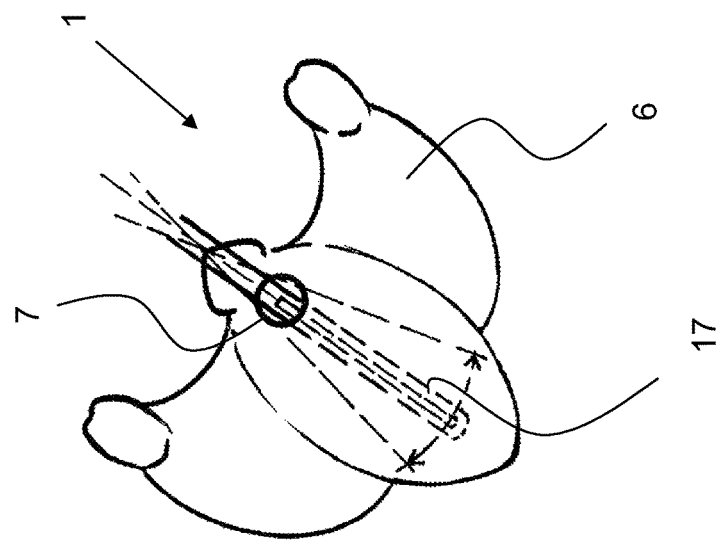
FIGS. 7a and 7b show a detail of a step of the method according to the present invention.
Figure 7A:
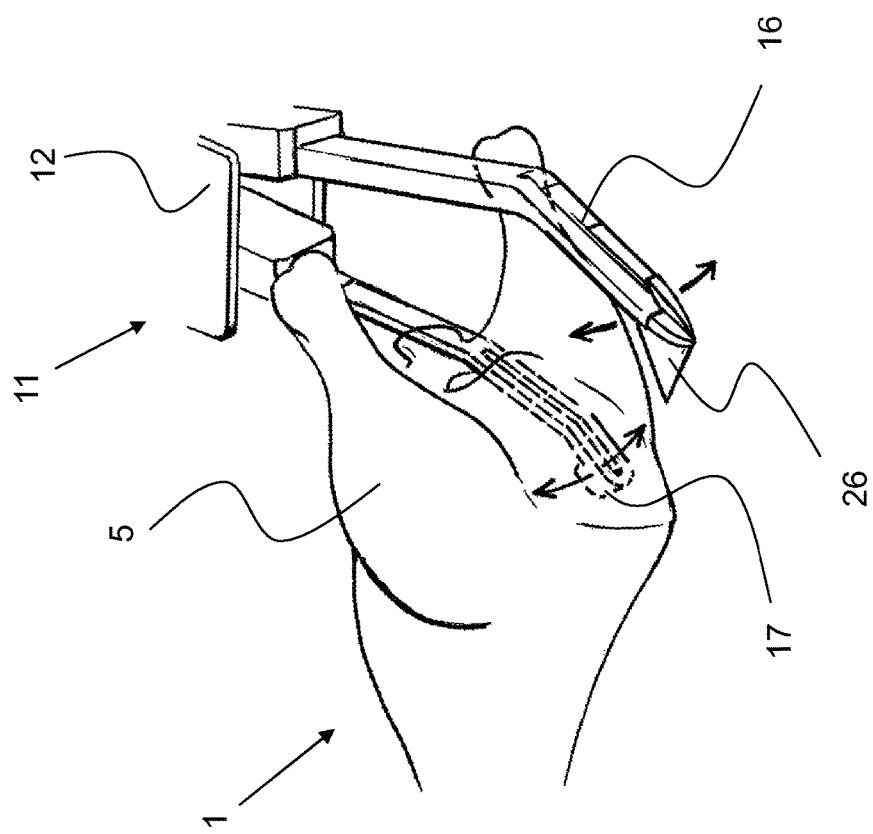

The skilled person will appreciate that the invention is not limited to incisions fully extending in the median plane or the transversal plane. In principle the incisions may extend in any direction, as long as they are provided at an angle different from 0° relative to each other, preferably an angle of at least 30°. FIG. 7a shows how the angular orientation of the second incision can be realised by moving the tensioning element forward and backward under the skin and possibly maintaining the desired angular position upon making the second incision.

Figure 8A:
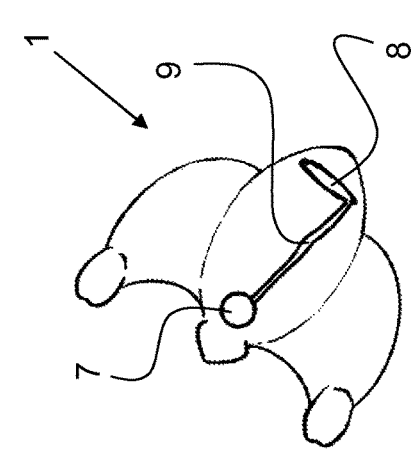
FIGS. 8a and 8b show a third embodiment of a meat product according to the present invention.

FIG. 8a shows a third embodiment of a fowl 1 obtained by means of the method. A relatively small first incision 9 has been made near a breast side of the fowl 1, and the second incision 8 extends from said relatively small first incision 9 up to the cloaca 7. The first incision 9 is much smaller than the second incision. In one embodiment, the first incision is less than half the length of the second incision 8, in the embodiment shown herein it is less than one fifth thereof and in one embodiment it is less than one tenth thereof.

Figure 9A:
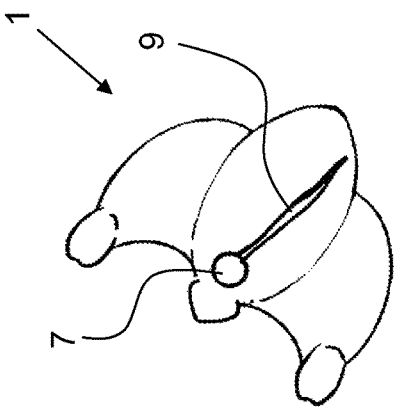
FIGS. 9a and 9b show a fourth embodiment of a meat product, in a first step.
Figure 9B:
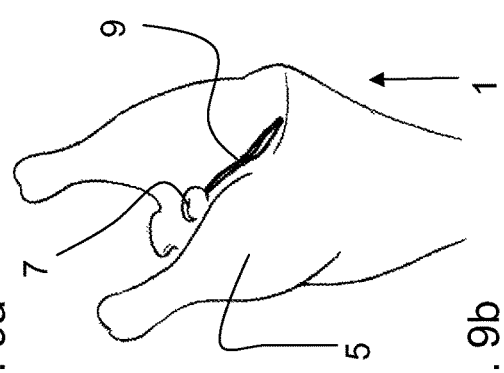

FIGS. 9a and 9b show a belly view and a perspective view, respectively, of a fowl according to a fourth embodiment of the invention obtained in a first step of the method. According to said first step, a first incision that extends from the cloaca to a breast side of the fold 1 is first made in this case, which first incision 9 does not fully extend in the median plane but at an angle thereto. It is noted in that regard that the angle is relatively small, so that said first incision nevertheless predominantly extends in the median plane. The angle has been obtained in the manner previously described with reference to FIG. 7a and FIG. 7b.

Figure 10A:
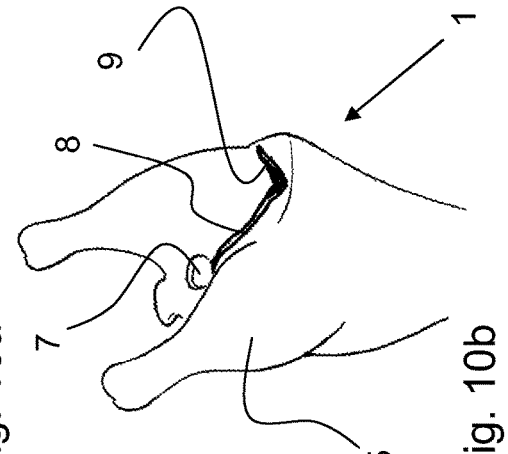
FIGS. 10a and 10b show a meat product according to the fourth embodiment of the present invention.
Figure 8B:
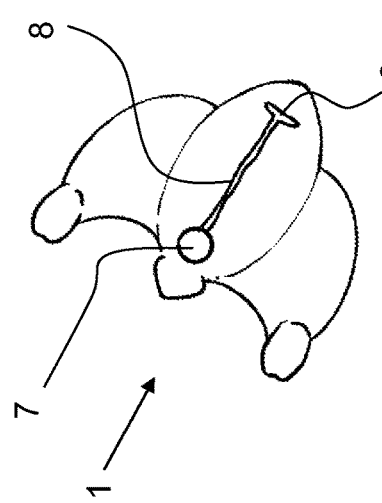
Figure 10B:
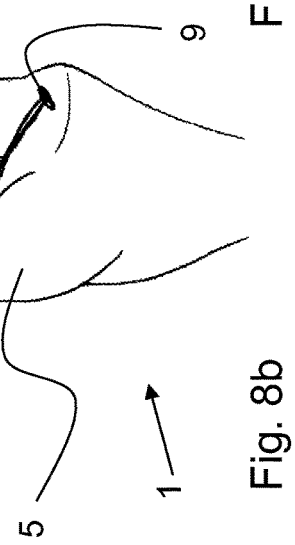

FIGS. 10a and 10b show a belly view and a perspective view, of a fourth embodiment of the product obtained by means of the method, in which also a second incision extending at an angle to the first incision 9 is provided. The second incision 8 has been made so that a substantially L-shaped incision 8, 9 has been obtained.

Figures and 11a-11d are more detailed views showing the various steps of the method according to the present invention. FIG. 11a shows the fowl 1 which is suspended, in a manner not shown, with its legs from a suspension hook of a conveyor. The stretching element 17 has been inserted via the cloaca of the fowl 1. The second cutting means 16 of the device 11 are still disposed above said stretching element 17, such that the knife 26 of the second cutting means is spaced from the skin 10 of the fowl 1. FIG. 11b shows a first step of the method in which the circular cutting element 28 of the second cutting means is moved toward the skin 5 10 and cuts therethrough. In FIG. 11c, the rotary cutting means 28 is shown to be spaced from the fowl again. The stretching element 17 is subsequently moved a little further, such that the knife 26 touches the edge of the first incision upon moving downward. When subsequently the skin 10 is cut through (see FIG. 11d), a substantially T-shaped cut is obtained, therefore.

Figure 12:
FIG. 12 shows a fifth embodiment of a meat product according to the present invention.

FIG. 12, to conclude, shows a fifth embodiment, in particular an embodiment in which the legs 5, 6 of the fowl 1 are inserted into the interior of the trunk via a skin fold 9 obtained by means of the method, such that a visually attractive fowl 1 is obtained. Such positioning of the legs 5, 6 is used in some countries before the chicken is actually packaged, since this is more attractive to the consumer and thus adds to the value of the product.

The skilled person will appreciate that in the foregoing the invention has been described with reference to a few possible embodiments, which are preferred. The invention is not limited to these embodiments, however. Many modifications are conceivable within the framework of the invention. The requested protection is defined in the dependent claims.

The invention claimed is:

1. A device for cutting open a slaughtered animal which is suspended with its legs from a suspension hook of a conveyor, wherein the slaughtered animal is fowl having a removed cloaca thereby rendering a cloaca opening in the fowl,
   wherein the device comprises first cutting means for making a first incision in the skin of the slaughtered animal, wherein the first incision is spaced from the cloaca opening of the fowl, which first cutting means are designed so that the first incision can be made substantially in a first direction of the slaughtered animal, wherein the first cutting means comprise a rotary cutting element, wherein the rotary cutting element is positioned horizontally in relation to the slaughtered animal such that the first incision can be made substantially in a horizontal direction of the slaughtered animal,
   wherein the device comprises second cutting means designed for making a second incision connected to the first incision and extending at an angle thereto in the skin of the slaughtered animal.

2. A device according to claim 1, further comprising stretching means for stretching the skin of the slaughtered animal.

3. A device according to claim 2, wherein the stretching means are provided near the second cutting means.

4. A device according to claim 1, wherein the second cutting means comprise a knife element.

5. A device according to claim 1, wherein the second cutting means are disposed opposite the first cutting means.

* * * * *